US012663134B2

(12) United States Patent
Kreml et al.

(10) Patent No.: US 12,663,134 B2
(45) Date of Patent: Jun. 23, 2026

(54) CONTROL OF VEHICLE HEADLAMPS

(71) Applicant: PO Lighting Czech, s.r.o., Jicina (CZ)

(72) Inventors: Tomas Kreml, Jicina (CZ); Jiri Martoch, Jicina (CZ); Radim Siuda, Jicina (CZ)

(73) Assignee: PO Lighting Czech, s.r.o., Senov u Noveho Jicina (CZ)

( * ) Notice: Subject to any disclaimer, the term of this patent is extended or adjusted under 35 U.S.C. 154(b) by 111 days.

(21) Appl. No.: 18/671,225

(22) Filed: May 22, 2024

(65) Prior Publication Data

US 2025/0361998 A1 Nov. 27, 2025

(51) Int. Cl.
*F21S 41/27* (2018.01)
*F21S 41/141* (2018.01)
*F21S 41/663* (2018.01)
*F21W 102/14* (2018.01)

(52) U.S. Cl.
CPC ............. *F21S 41/27* (2018.01); *F21S 41/141* (2018.01); *F21S 41/663* (2018.01); *F21W 2102/14* (2018.01)

(58) Field of Classification Search
CPC ........ F21S 41/27; F21S 41/141; F21S 41/663; F21W 2102/14
See application file for complete search history.

(56) References Cited

U.S. PATENT DOCUMENTS

| | | | | |
|---|---|---|---|---|
| 9,873,372 | B2 * | 1/2018 | Son | B60Q 1/1423 |
| 12,358,586 | B2 * | 7/2025 | Inoue | H05B 47/115 |
| 2016/0159272 | A1 * | 6/2016 | Kataike | B60Q 1/12 315/80 |
| 2016/0288696 | A1 * | 10/2016 | Kreml | G01M 11/0242 |
| 2020/0032973 | A1 * | 1/2020 | Renaud | F21S 41/255 |
| 2023/0001846 | A1 * | 1/2023 | Hori | B62J 6/02 |
| 2024/0019099 | A1 | 1/2024 | Ekladyous et al. | |
| 2025/0222856 | A1 * | 7/2025 | Kito | F21S 41/663 |

FOREIGN PATENT DOCUMENTS

WO WO-2025004953 A1 * 1/2025 ............. B60Q 1/143

OTHER PUBLICATIONS

Machine Translation of WO2025/004953A1. (Year: 2025).*

* cited by examiner

*Primary Examiner* — Alexander H Taningco
*Assistant Examiner* — Pedro C Fernandez

(57) ABSTRACT

A headlamp of a vehicle comprises at least three modules producing a beam intended to be projected ahead of the vehicle when the headlamp is mounted thereon to illuminate a field of view defined in relation to the position of a driver seated in the vehicle. A high module projects a high beam, a low module projects a low beam made of a primary elongated area and an extended area of lower light intensity. An intermediary module projects an intermediary beam. A method for controlling the headlamp and a computer program implementing the method are also disclosed.

13 Claims, 11 Drawing Sheets

CONTROL OF VEHICLE HEADLAMPS

TECHNICAL FIELD

The technical field of the invention is the control of a vehicle headlamp with light sources for high/low/intermediary beams.

BACKGROUND OF THE INVENTION

Regulation requirements set by the Department of Transportation's National Highway Traffic Safety Administration ("NHTSA") include both static and dynamic tests, which ensure that a system for controlling a vehicle headlamp can adapt to changing road conditions or vehicle movements in real-time.

Existing onboard systems help the driver adjust the beams, in particular, to prevent glaring at the driver of another car, either coming in the opposite lane of the road or driving in the same direction. The adjustment can be automatic. In such a case, sensors such as lidars, cameras, and a processing unit reshape the beams to provide illumination of the environment in front of the vehicle, in the field of view of the driver, adapted to the instant needs. Automatic systems of this kind are called Adaptive Driving Beam systems, referred to as ADB systems.

ADB systems are regulated. They must pass official tests that usually include static tests and dynamic tests.

In particular, the US requires static and dynamic tests for vehicle headlamps, as defined by the above-mentioned mentioned NHTSA.

Technical Problem

A drawback of the existing onboard ADB systems is the difficulty to meet the regulation. It requires that many parameters are controlled. Hence, an accurate control of the light sources is required.

In addition, the requirements sometimes look conflicting. One of the possible conflicting requirements is the following:

- to provide a minimal illumination intensity at a specific location of the driver's field of view in order to ensure a good view of the road ahead, and
- not to exceed an illumination intensity limit for glare control in a specific region of the field of view where the eyes of another driver may appear.

The conflict may arise when the specific location and the specific region are close to each other. In particular, this may occur on a right curve, because the height of the glare legal test specific region falls within the same range as the minimal illumination specific location.

Conflicting requirements lead the skilled person to increase the complexity of system, the beam resolution, and the accuracy of beams adjustment devices. Indeed, it can be inferred that the more accurate the control of the beam, the easier special requirements can be met, even if conflicting test areas fall in the same vicinity.

However, the more accurate the resolution, the more expensive are the headlamp and ADB system. Such a cost increase is incompatible with the industry's permanent trend to lower costs. Because of this, today, such technical improvements are limited to high-end vehicles.

US 2024/0019099 A1, in the name of Ekladyous et al., entitled "OPERATING AND CERTIFYING AN ADAPTIVE DRIVING BEAM SYSTEM", and published on Jan. 18, 2024 discloses a way to meet the requirements of a static test in the US through an increased beam resolution, thanks to a matrix light source and pixel-based brightness control. However, as explained, this is not cost-effective. Moreover, this document does not teach how to perform the control. Presumably, it leads to a complicated system that can adjust the brightness of local parts of the beams.

SUMMARY OF THE INVENTION

A purpose of the invention is a straightforward solution that meets the regulation requirements at a reasonable cost while preserving the illumination's efficiency.

The purpose of the invention is a headlamp of a vehicle, said headlamp comprising at least three modules producing a beam intended to be projected ahead of the vehicle when the headlamp is mounted thereon to illuminate a field of view defined in relation to the position of a driver seated in the vehicle,

- wherein each module comprises a light source and a set of optics configured so that said module projects its beam over an elongated area of the vision field, said elongated area having a rectangular or ovoid shape extending along a horizontal axis,
- and wherein the at least three modules comprise a high module projecting a high beam over a high elongated area, a low module projecting a low beam over a primary low elongated area and an intermediary module projecting an intermediary beam over an intermediary elongated area,
- and wherein the low elongated area is located below the high elongated area, and wherein the intermediary elongated area overlaps both the low and high elongated areas.

The headlamp is characterized in that the low module is configured so that it also projects light at a limited illumination power, compared to the illumination power of the primary elongated area, over an extended area connected to and located above the low elongated area and partially overlapping the intermediary elongated beam.

One advantage of the invention comes from the extended area supplementing the primary low elongated area of the low module, with a light intensity lower than the light intensity for the primary low elongated area. With an appropriate combination of the extended area and intermediary beam, it is possible to cope with conflicting regulations at low cost.

According to a specific embodiment, the headlamp comprises a light source in the low beam module that produces multiple levels of illumination over its primary area and the extended area above the primary area. Adapted optics help distribute the light rays in the areas. In another embodiment, two different light sources are used.

According to a specific embodiment, each elongated area has dimensions varying depending on driving scenarios, comprising high-beam areas ranging from 8°×30° to 12°×50°, low-beam areas larger than the high beam regions (12°×60° to 18°×100°, and intermediary beams comprising a moderate size.

According to a specific embodiment, the optics configuration in each module affects its beam pattern through lens shapes, aperture sizes, and beam splitters.

According to a specific embodiment, the headlamp comprises an adjustable power output range for each module to meet different driving scenarios, comprising high beams with a maximum intensity up to approximately 1,000 cd, low beams with a minimum illumination level down to around 500 cd and adjustability between these ranges.

According to a specific embodiment, the headlamp comprises a control unit that adjusts power output based on ambient lighting conditions to maintain consistent illumination levels across different regions.

According to a specific embodiment, the size and shape of the primary area is adjustable for city vs highway modes or other driving scenarios.

According to a specific embodiment, the light source used within the modules is an LED-based technology for energy efficiency and reliability.

According to a particular embodiment, the light source of the high and/or intermediary module is divided into many segments. Hence, in the operating conditions of the high module adapted to said actual environment, segments of the light source illuminating the specific location can be kept off or switched off.

According to a particular embodiment, the intermediary beam is a kink beam. It can also be divided into many segments. Some of said segments can be neutralized when needed to keep off or switch off the intermediary beam.

An object of the invention is also a method for controlling the above defined vehicle headlamp, characterized in that it includes the following steps:

- considering the field of view ahead of the vehicle, elect a specific location of the extended area where light intensity cannot be less than a threshold higher than the limited illumination power, and a specific region of the extended area, not including the specific location but relatively close to it, where light intensity cannot exceed a glare limit,
- calculate the amount of illumination in the specific region of the field of vision with the high module and the low module on,
- if, in the specific region, the high module is on and the amount of illumination is higher than the glare limit, switch off at least partially the intermediary module so that the intermediary elongated area does not cover the specific region,
- if, in the specific region, the high module is off and the amount of illumination in the specific location is lower than the threshold, switch on the intermediary module so that the intermediary elongated area increases light of the extended area.

In this context, "switch off at least partially a module" means:

- If the light source is integral, it is kept off or switched off,
- If the light source is divided into many segments, then only segments of the light source illuminating the intended location are kept off or switched off.

In this context, "calculated operating conditions of the high module adapted to the actual environment" means that the high module is on so as to optimize illumination of the field of view in the driving conditions and avoiding glare another driver.

In this method, the headlamp does not require any ADB system. This part of the headlamp system is working independently. The ADB system decides whether the high module should be partially turned off when another car is detected in the field of vision. This decision impacts the tests in the last two steps of the above method. And according to the method of the invention, the intermediary module is used to contribute or not to the illumination.

Another object of the invention is a computer system for controlling a vehicle headlamp as defined above, characterized in that said system comprises a computer loaded with instructions that, when executed by said computer, cause the computer to perform the above-described method.

An object of the invention is also a vehicle headlamp system comprising the above-described headlamp, an ADB system able to monitor the car's actual environment in the field of view and calculate operating conditions of the high module adapted to said actual environment, and a simulation module able to simulate the illumination of the vision field in the calculated operating conditions of the high module, with the low module switched on.

The simulation module is a useful component of the vehicle headlamp, that ensures the driver can see clearly ahead while still maintaining safety and comfort on the road. This module simulates the illumination of the vision field using the high beam with its light sources switched on, based on the car's actual environment.

The system is configured to handle dynamic changes in road conditions or vehicle movements while maintaining compliance with NHTSA regulations through the use of sensors that continuously monitor the environment and adjust the headlamps accordingly.

The system can use sensors such as lidars, cameras, and a processing unit to monitor the car's actual environment and provide accurate data about the road ahead. Lidars work by emitting laser pulses and measuring the time it takes for them to bounce back after hitting objects in their path. Cameras capture images of the road ahead and can detect the position and movement of vehicles and obstacles. The processing unit processes the data from these sensors to provide accurate information about the environment.

The headlamp can be configured, and the method adjusted to handle situations where multiple elected locations require adjustments to meet with regulatory requirements, as long as all these locations are covered by the intermediary beam. This allows for flexibility in adjusting the light sources based on regulation requirements and dynamic tests conducted by NHTSA. Additionally, the system can be programmed, and the method adapted to prioritize certain elected locations if some are conflicting when adjusting the light sources based on these requirements.

The field of view sensors contribute to determining the areas of the field of view where appears another vehicle coming from an opposite direction or driving in the same direction. Then, the system can calculate beam positions and the appropriate illumination mode of the high beam and intermediary beam to avoid glare or other visibility issues while maintaining safety and comfort on the road.

BRIEF DESCRIPTION OF DRAWINGS

The invention will be better understood with the non-limiting examples disclosed hereafter. Drawings illustrate these examples.

DESCRIPTION

Figure 1:
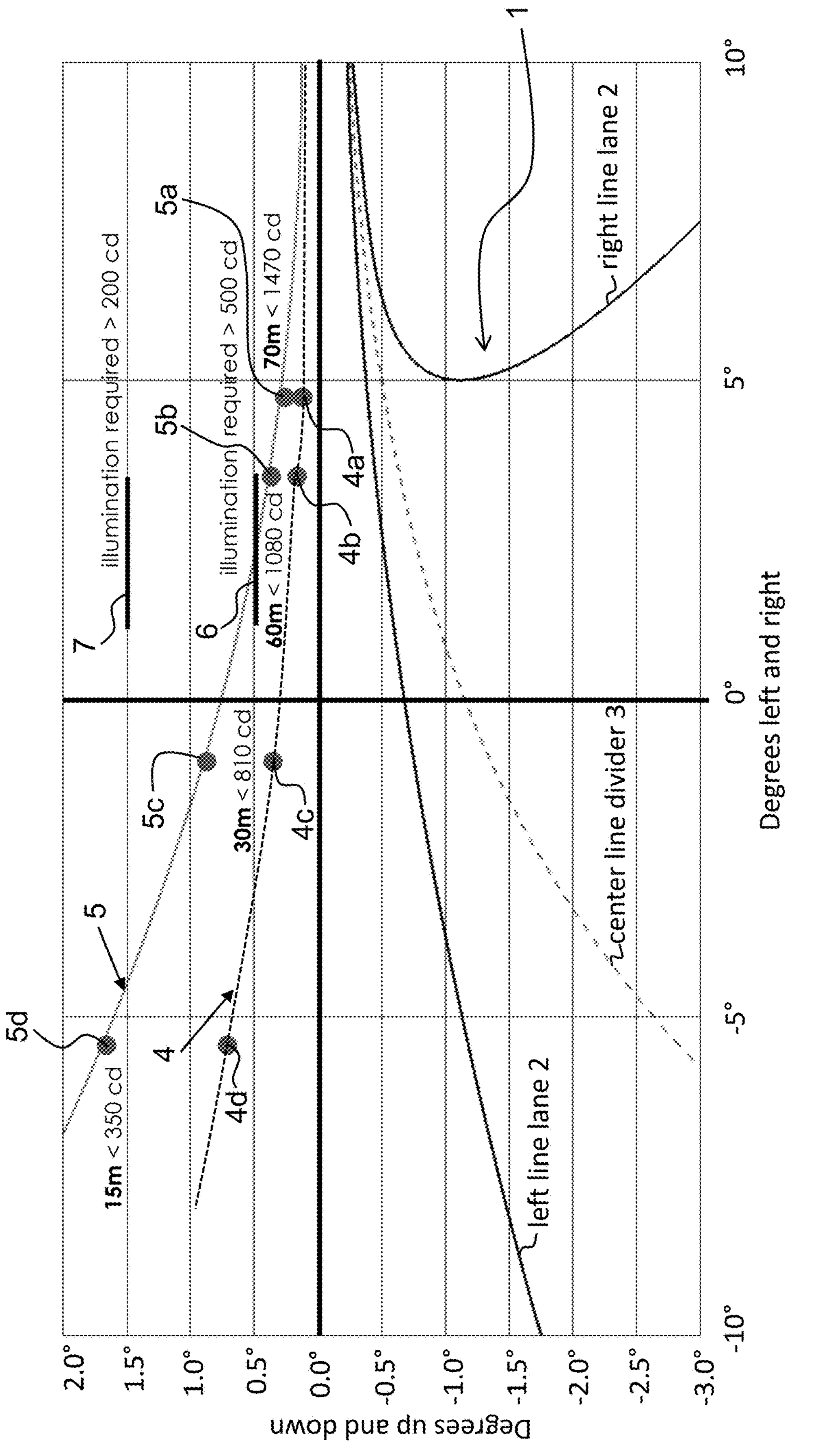
FIG. 1 is a field of view ahead of a vehicle equipped with a headlamp according to an embodiment of the invention.

The field of view represented in FIG. 1 shows a road 1, delimited by continuous lateral lanes 2 of a right-hand bend, with a center line divider 3. The horizontal axis measures the lateral angle (° for degrees, left and right) and the vertical axis the vertical angle (° for degrees, up and down).

In this embodiment, a certain regulation is taken as an example.

Above the road, two curves 4, 5 show the height of an opposite driver eye position as a function of the lateral angle. The regulation of the example defines four specific regions a, b, c, d where, in case a risk of glare is detected, the brightness of illumination cannot supersede a maximum value set by the regulation. The dotted line curve 4 is for a height of 0.9 m (2.95 ft) of an opposite driver eye position and the continuous line curve 5 is for a height of 0.7 m (2.30 ft).

For instance, on the curve of FIG. 1:

in specific region a, a car 70 m (230 ft) away appears at 4.8° right, in specific region b, a car 60 m (197 ft) away appears at 4° right, in specific region c, a car 30 m (98 ft) away appears at −1° left, in specific region d, a car 15 m (49 ft) away appears at −5.5° left.

On the same graph, two specific locations 6, 7 are represented by a bold stroke, between 1° and 3° right lateral angle. In these two specific locations 6 and 7, according to the regulation of the example, the illumination provided by a headlamp under non-glare conditions must be greater than a given threshold. The threshold for location 6 at 0.5° up is 500 cd and 200 cd for location 7 at 1.5° up.

Continuous line curve 5 defines, at the specific region 5*b*, the height of an opposite driver eye position very close, in the field of vision, to the 0.5° specific location 6 (threshold at 500 cd). This means that an opposite car 60 m (197 ft) away would require, according to the regulation of the example, that the light intensity does not exceed the anti-glare limit of 1080 cd, but also remains higher than the minimal requirement of 500 cd. These two requirements are not far from being in conflict, as they define a very restricted space where illuminance could be in excess or short of the requirement.

Figure 10:
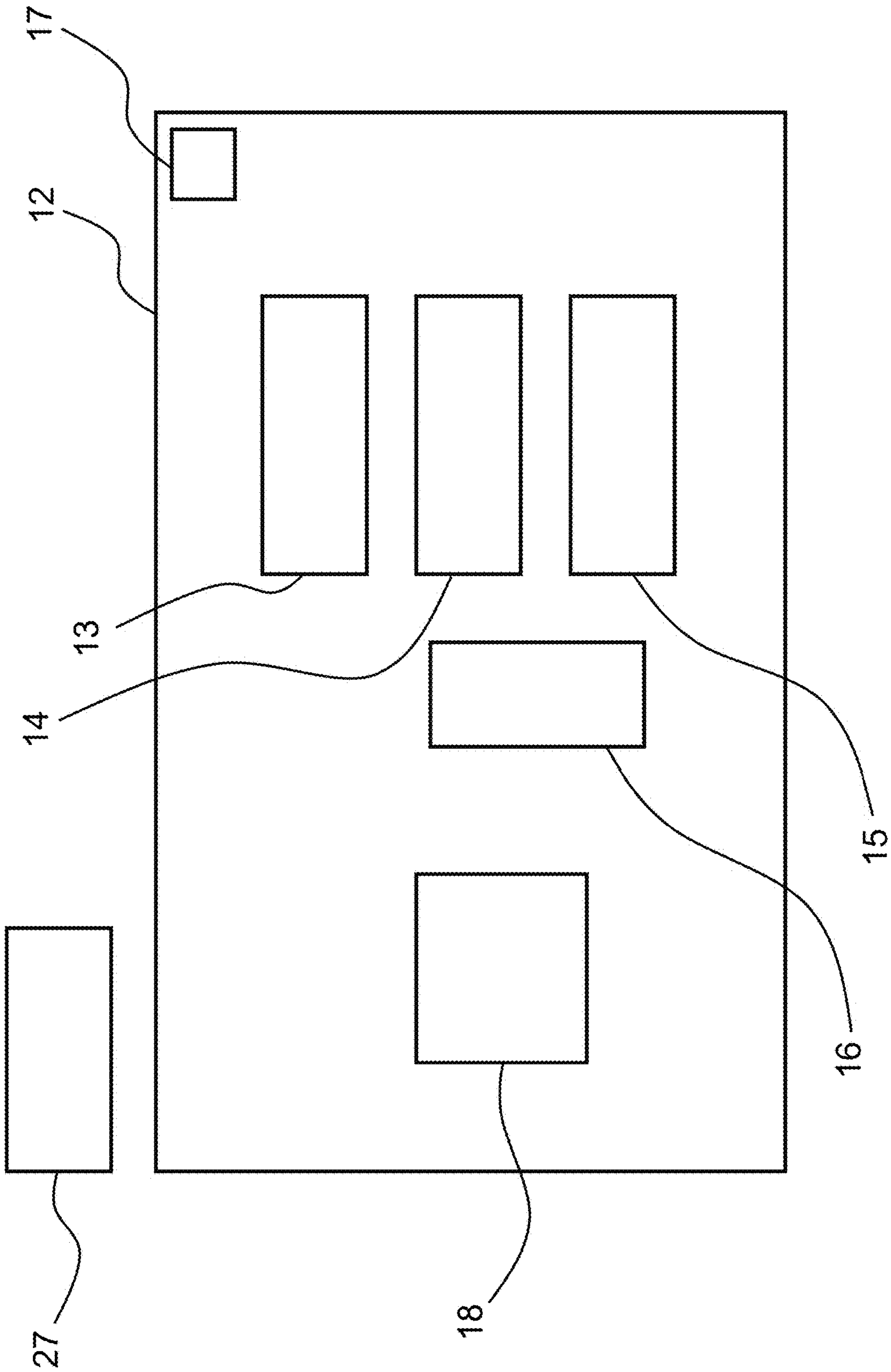
FIG. 10 is a schematic view of a headlamp according to the embodiment.

The car (not shown) is equipped with a headlamp 12 that comprises three light modules: a high module 13, a low module 14, and an intermediary module 15 as depicted in FIG. 10. Each of these modules produces a beam intended to be projected ahead of the vehicle when mounted on it.

Headlamp 12 also includes an ADB system 16 (for Automatic Adaptive Driving Beam system). ADB system 16 has sensors such as a camera 17 and its associated software, onboard, that can detect an opposite car or another car on the same lane driving in the same direction and track its position on the road.

Headlamp 12 is also associated with a simulation module 18. Simulation module may be inside headlamp 12, as shown, or outside it.

With a computer 27 able to perform the controlling method that will be described, headlamp 12 forms a vehicle headlamp system. Computer 27 is loaded with instructions that, when executed by said computer, cause the computer to perform the method. Computer 27 may be dedicated to this function or may be part of a larger on-board computer system.

The headlamp's design allows for adjustable power output from each module 13, 14, 15, enabling tailored illumination patterns based on driving scenarios. For instance, during highway travel with no traffic around, high beam intensity is optimal at a specific point along the field of view; conversely, when navigating city streets or encountering another driver in close proximity to one's own vehicle, low power output and glare reduction become more useful.

The modules' optics configurations contribute to shaping their respective beams.

The optics configuration may include lenses and reflectors designed specifically to shape beams into their desired rectangular or ovoid shapes. Various materials such as glass lenses and plastic reflectors (e.g., polycarbonate) are suitable options within each module's optic system. The design of these optics may be tailored to specific driving scenarios by adjusting factors like lens shapes, aperture sizes, or beam splitters' configurations to optimize illumination patterns for city vs highway modes.

In terms of beam divergence/convergence in each optics configuration, these parameters are tailored for specific driving scenarios (e.g., city vs highway). Individual adjustment is possible based on circumstances such as glare reduction.

Each module 13, 14, 15 in this headlamp 12 is configured to produce a beam that illuminates an elongated area of the field of view ahead of the vehicle when mounted on it. The beams illuminate specific areas of view in front of the car, defined relative to the position of a driver seated within.

Figure 5:
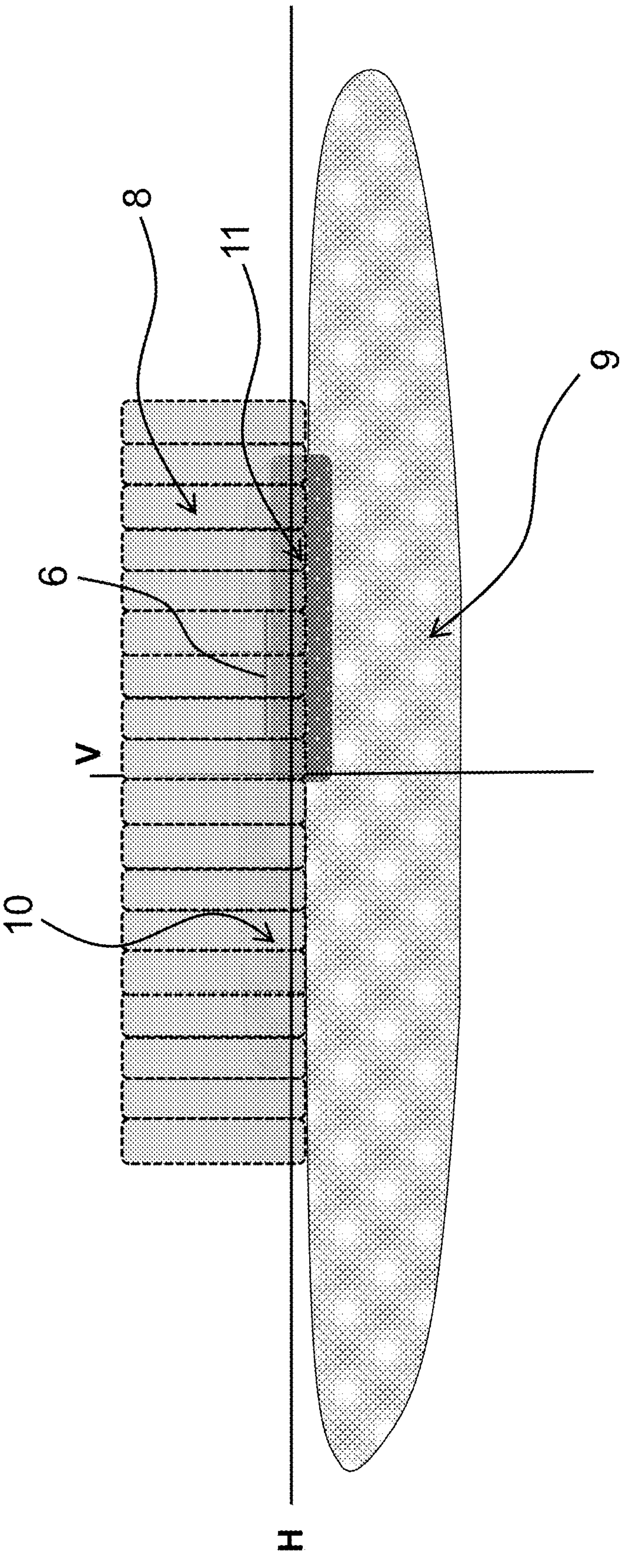
FIG. 5 shows the areas of the low and intermediary modules, as in FIG. 4, added to a high elongated area of a high module.
Figure 8:
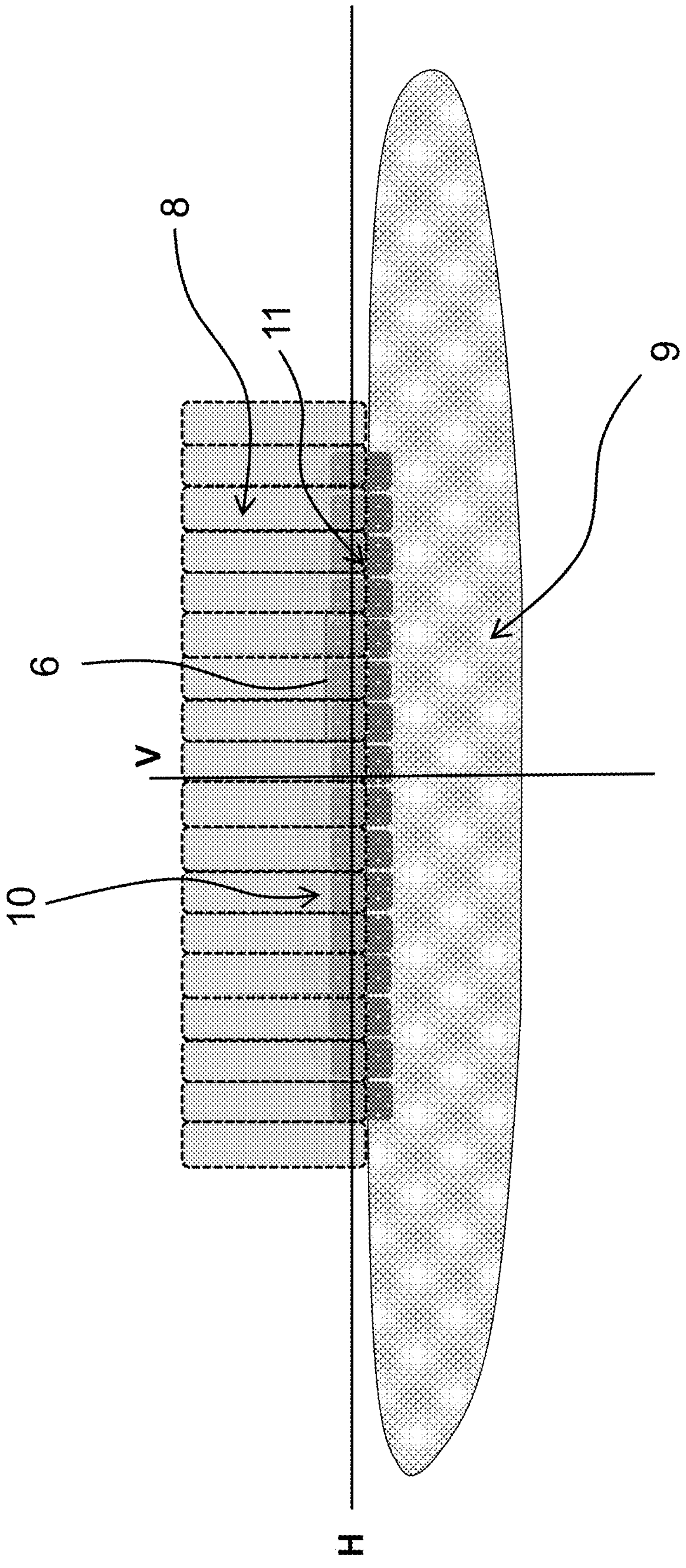
FIG. 8 shows the areas of the low and intermediary modules fully illuminated, as in FIG. 7, added to a high elongated area of a segmented light source.

High module 13, as show in FIG. 5 and FIG. 8, projects its light over a rectangular area 8 extending along a horizontal axis H, typically ranging from 10°×30° (width×height) to 20°×60° in size. This beam is intended for use during conditions where maximum illumination of the road ahead is necessary, such as on highways at night.

Low module 14 produces its light over a primary, elongated ovoid-shaped elongated area 9 with a certain light intensity, for example 10,000 cd, as shown in FIGS. 3-9.

Figure 3:
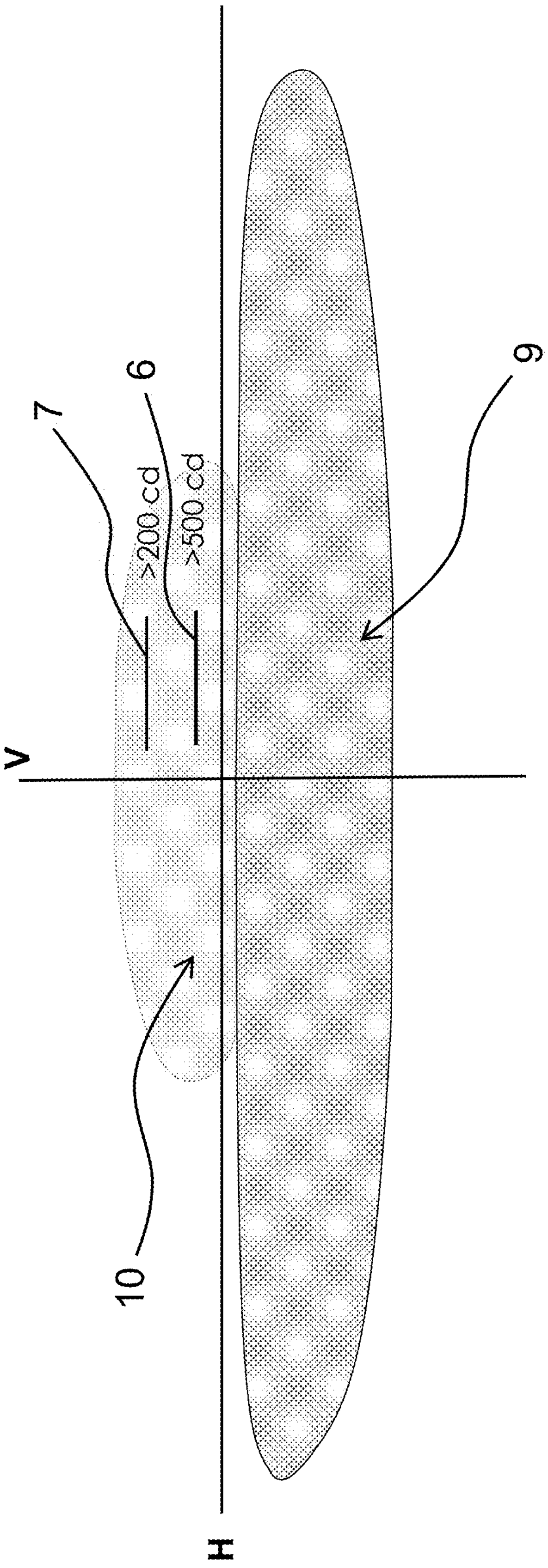
FIG. 3 shows a low elongated area and an extended area of a low module.

In addition to its primary area 9, the low module also projects light over an extended area 10 above its primary area 9 at a lower power level, for example 100-300 cd, i.e. of an order of magnitude 100 times lower than in the primary area, as shown in FIG. 3. Actually, the extended area 10 is illuminated in all the figures but is easier individualized in FIG. 3. Extended area 10 overlaps with but does not entirely cover high module rectangular area 8.

This additional lighting may be achieved through various means: in some cases, adjustable current or voltage control is used; other embodiments employ optical filters and beam splitters for more precise adjustments. In brief, low module 14 is configured to provide two fixed levels: one for projecting over primary area 9 and another level, lower than the previous one, that provides illumination over extended area 10 above primary area 9.

Figure 12:
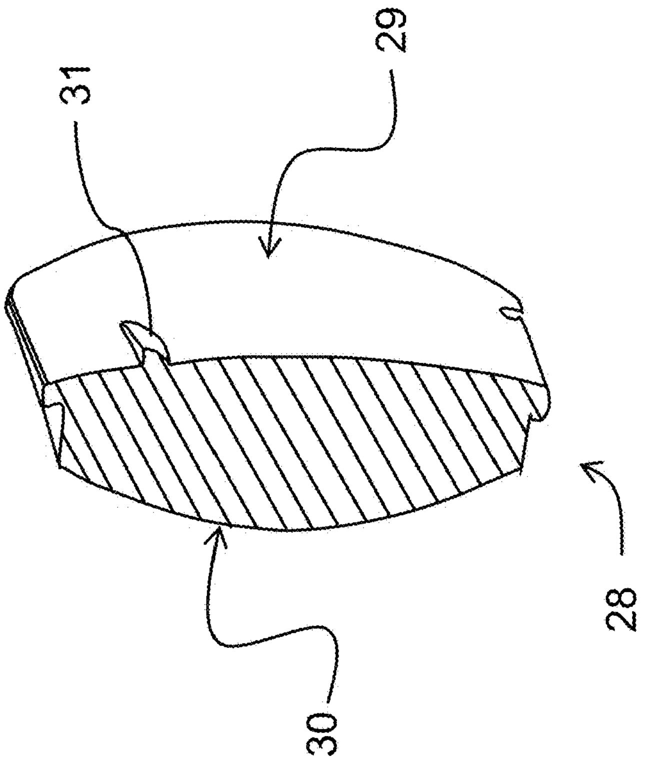
FIG. 12 is a cross-section of FIG. 11 in plane XII-XII.
Figure 11:
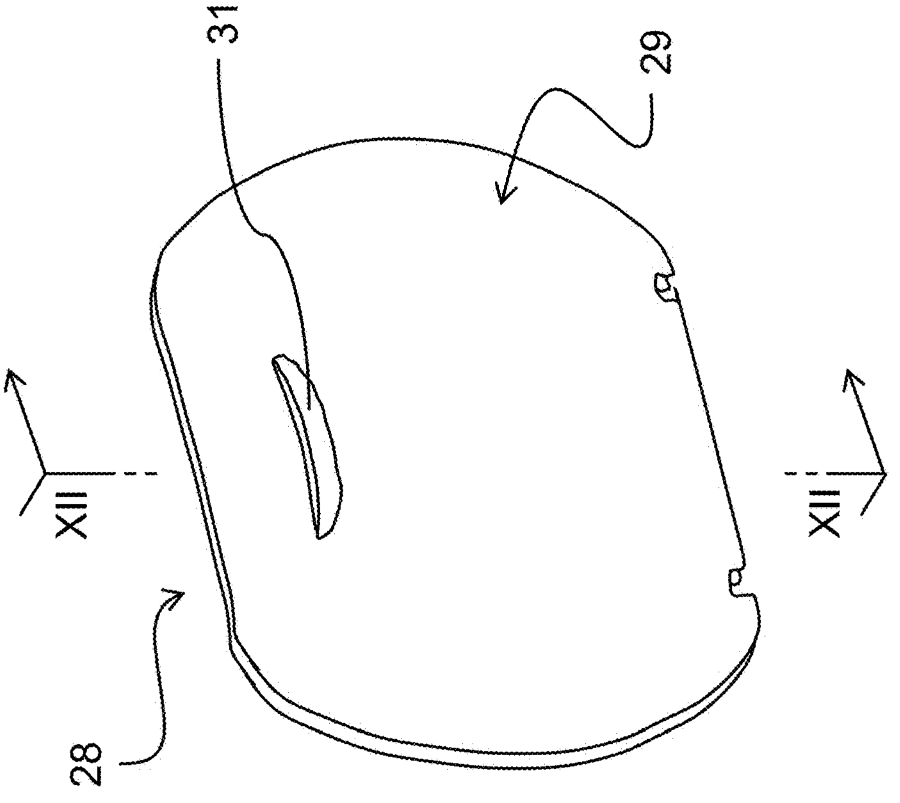
FIG. 11 shows an example of a projector lens producing the primary area and the extended area of the low module.

In FIG. 11 and FIG. 12, an example of a low-beam projector lens 28 able to produce a primary beam to cover primary area 9 and a secondary beam to cover extended area 10 is disclosed. Projector lens 28 is globally a convex lens having a rear input surface 29 and a front output surface 30, that creates the primary beam covering primary area 9. Protruding from input surface 29, a convex lip 31 with a different inclination modifies the angle of incidence of the input beam and sends light up to create the secondary output beam covering extended area 10. The advantage of this one-part projector lens is that it does not increase the cost of the headlamp, either in terms of components or assembly.

Intermediary module 15 produces its own unique pattern of illumination in the shape of an elongated rectangular area 11 that overlaps both high module area 8 and low module areas 9, 10, but does not entirely cover either, as can be seen in FIG. 5. This overlap enables seamless transitions between beams when switching from one to another, ensuring a consistent level of lighting across different areas ahead of the vehicle and enables dynamic adjustment in response to changing driving conditions.

The power output of each beam may be adjusted independently through various techniques: in some embodiments, current or voltage control is used to regulate illumination levels within specific ranges (e.g., 500-1500 lumens), while others employ diffusers and beam splitters for more precise adjustments.

The overlap between the modules' areas is also adaptable to accommodate driver preferences, environmental factors like fog, and vehicle speed. Furthermore, multiple power levels within a single module may be achieved through various methods: adjusting current or voltage control; optical filters splitting beams among areas.

In high module 13 and intermediary module 15, multiple light sources are used within each module: for example, LEDs or other high-efficiency technologies are arrayed along rows in linear patterns, providing segmented lights with individual segments controlled independently.

In another embodiment, multiple LEDs or other light sources are arranged along rows or columns for uniform lighting across their respective beam shapes.

In yet another specific embodiment of the high module configuration, a combination of LEDs with varying color temperatures may be used within its optical path to provide enhanced visibility in various driving scenarios. For example, blue-rich LED arrays may enhance contrast and improve night vision while white-light or yellow-tinted LEDs contribute more diffuse lighting for improved road surface illumination.

Although this is not an obligation according to the invention, the power output of each module is adjustable based on ambient light conditions: high-beam intensity may decrease, possibly down to non-use, during daylight hours while low-beam headlights dim at night to improve visibility at a distance; intermediary modules may also adjust illumination levels according to specific driving scenarios. The size and orientation of elongated areas within a given module are not fixed but rather adaptable depending upon the circumstances.

Each possible monitored position of the opposite car follows the specific region curves 4, 5 when the road follows a right-hand bend as in FIG. 1.

Figure 6:
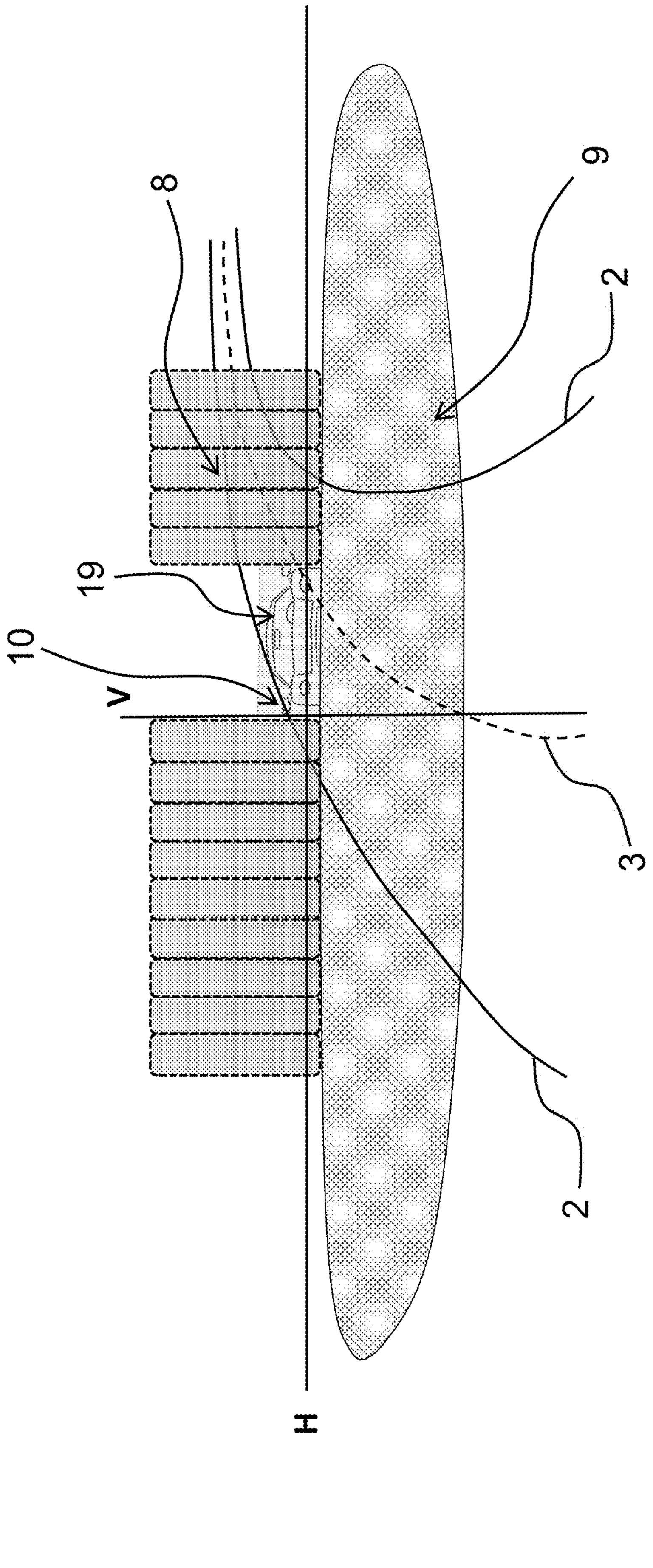
FIG. 6 shows the low and extended areas of the low module, added to partially illuminated area of the high module.
Figure 9:
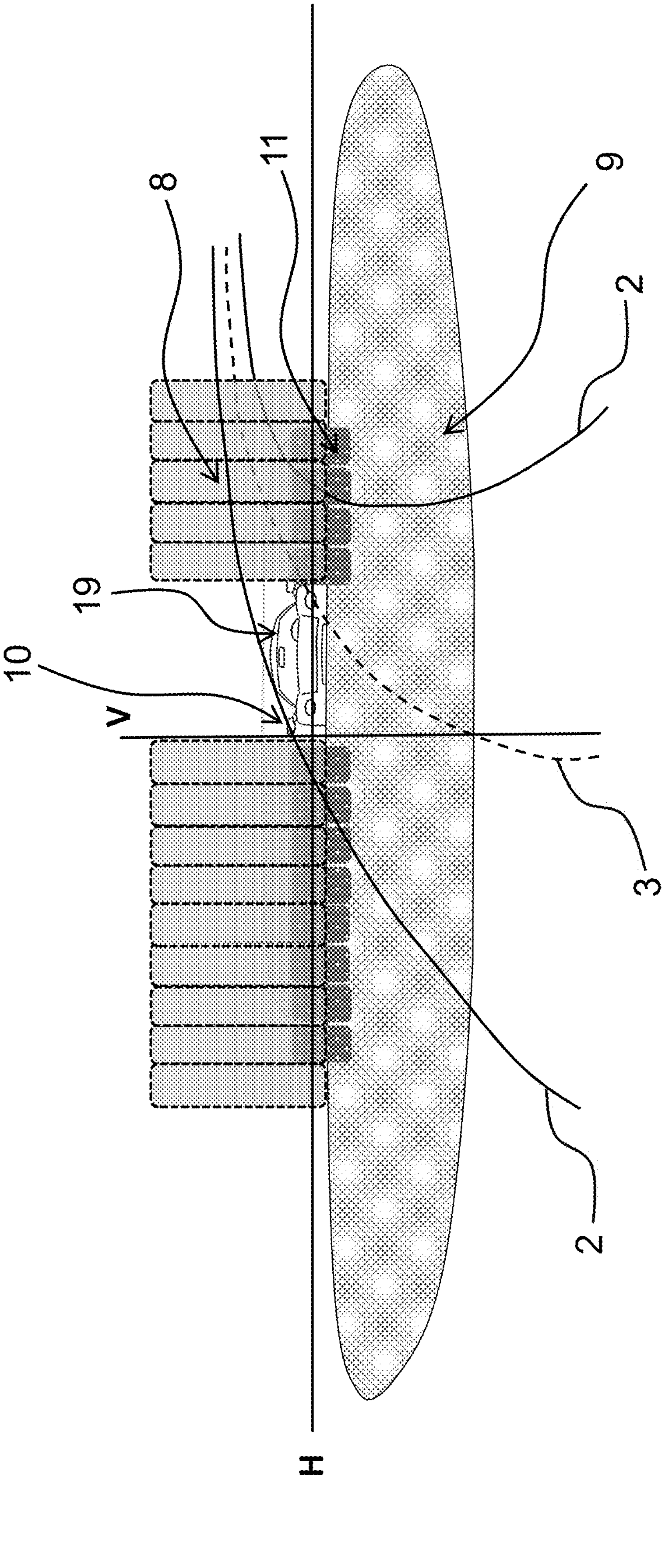
FIG. 9 shows the low and extended areas of the low module, and a partially illuminated area of the segmented intermediary beam, added to a partially illuminated area of the high module.

For instance, when approaching another vehicle on the same lane during night-time traffic or when an opposite vehicle is detected, the position 19 of this other vehicle, in the field of view is detected and high module 13 is partially switched off to stop illumination of area 8 at this position, while maintaining a low light output over extended area 10, as shown in FIG. 6 and in FIG. 9. Thus, glare of fellow drivers is avoided.

When intermediary module 15 has an integral light source, as in FIG. 6, said intermediary module is also switched off, so that any risk of glare is avoided.

When intermediary module 15 has a segmented light source, as in FIG. 9, only its part corresponding to the detected position is switched off. The rest of extended area 11 is illuminated.

In both cases, low module 14 remains on with light projected over its primary area 9 and extended area 10. Since extended area 10 has a low light intensity, it does not create any glare and the regulation requirement is met, even when position 19 corresponds to an opposite car located 60 m (197 ft) away between 1° and 3° right lateral angle, with a height of 0.9 m for the opposite driver eye position falling into region 5*b*.

Figure 4:
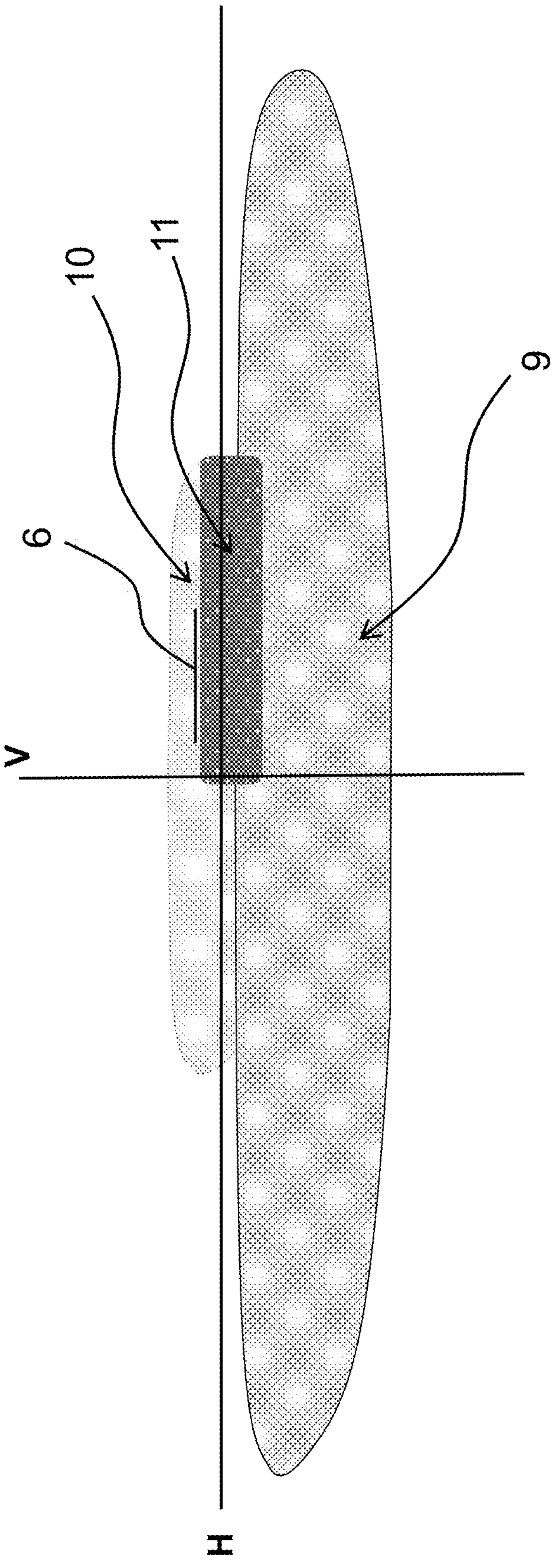
FIG. 4 shows the areas of a low module, as in FIG. 3, added to an intermediary area of an intermediary module using an integral light source.
Figure 7:
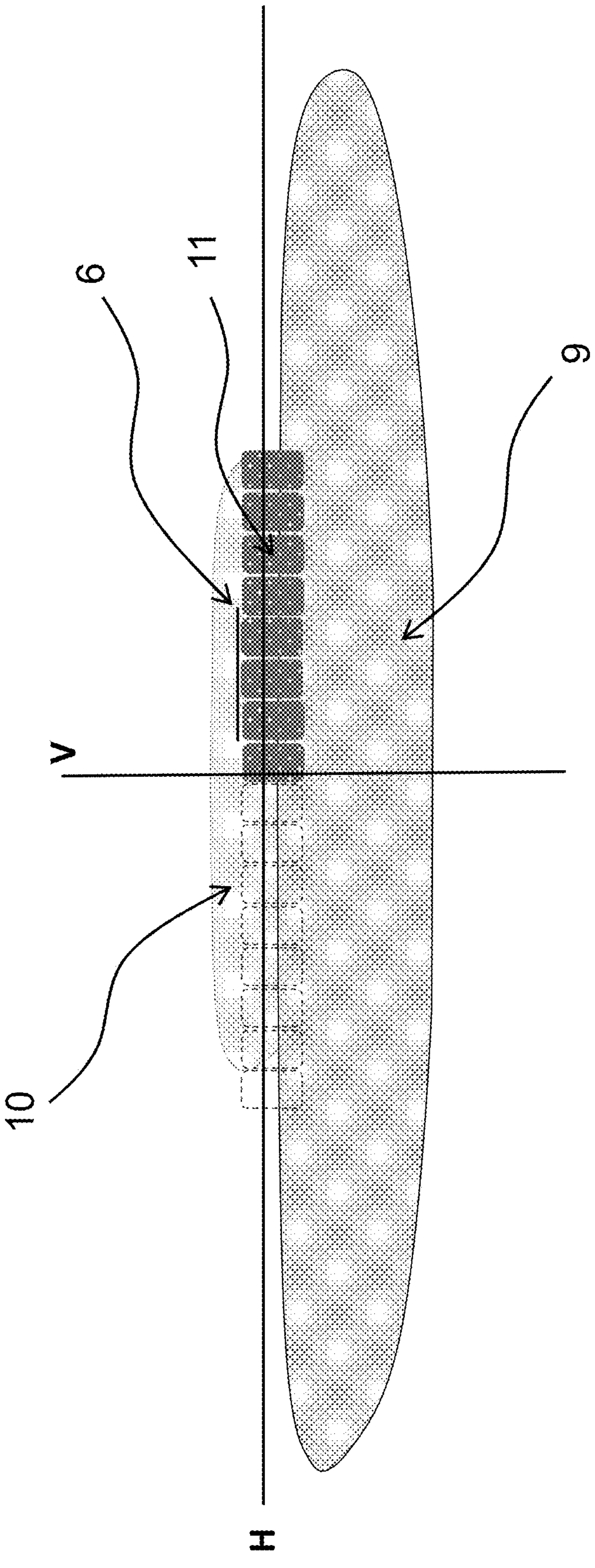
FIG. 7 shows the areas of a low module, as in FIG. 3, added to an intermediary area of a intermediary module using a segmented light source.

When no risk of glare is detected but the driving conditions do not allow switching on the upper beam, low module 14 is on, extended area 10 and intermediary area 11 included, as shown in FIG. 4 and in FIG. 7. In FIG. 4, the integral light source of intermediary beam, located at the right-hand side of the vertical axis V, is on. In FIG. 7, since intermediary module 15 has a segmented light source, only the segments located at the right-hand side of vertical axis V, which are adapted to the driving conditions, are on. In both cases, the illumination at specific location 6 identified by the bold stoke is sufficient to meet the regulated requirement of 500 cd minimum, thanks to the addition of light rays of extended low-beam area 10 and light rays of intermediary beam 11.

When no risk of glare is detected and the driving conditions allow switching on the upper beam, then all the beams are on, as in FIG. 8.

Figure 2:
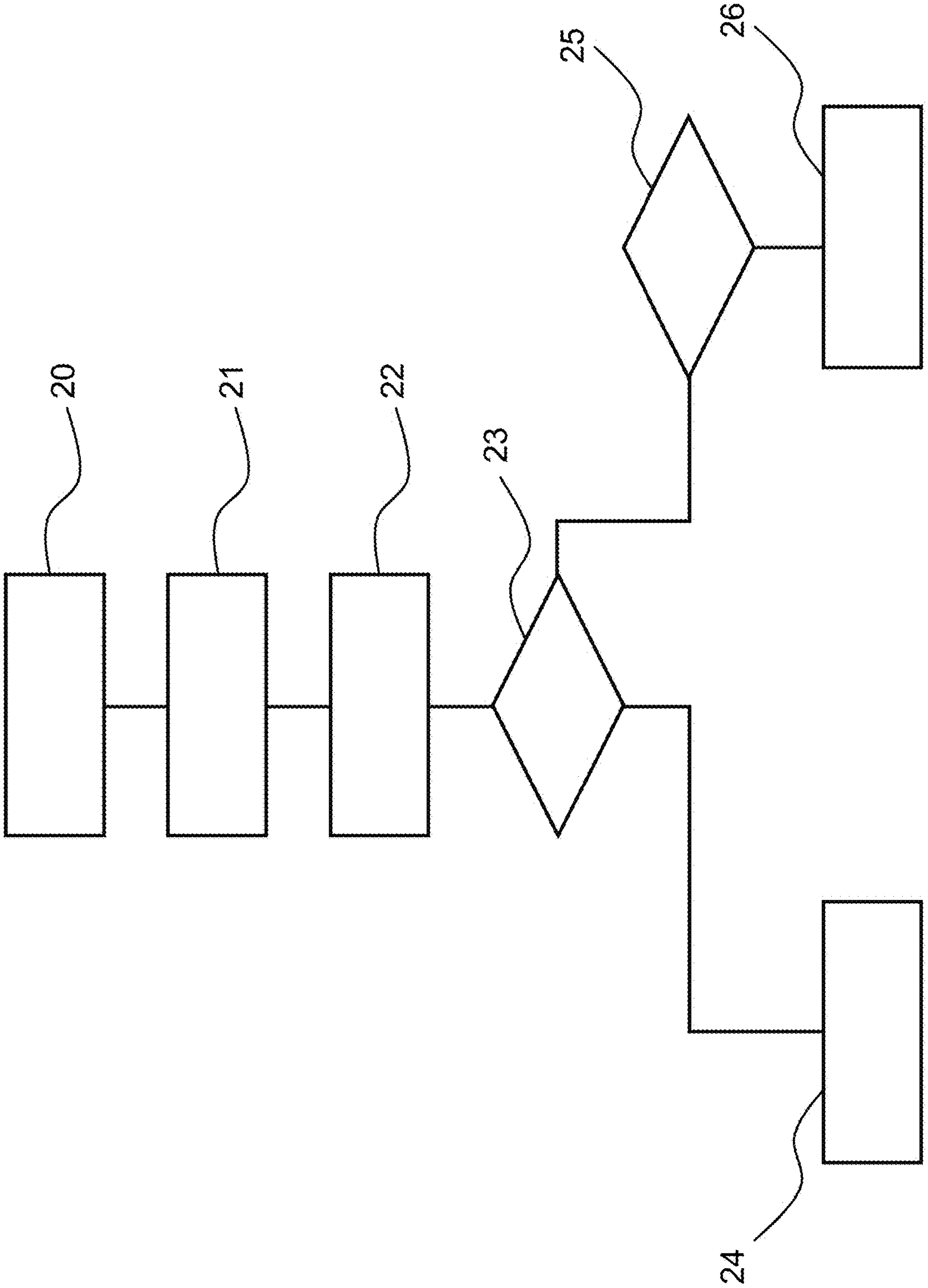
FIG. 2 is a logical flow chart of a process implementing the method of the invention.

The above various operating conditions can be managed according to the method of the invention when the following operations are performed, as shown in FIG. 2.

- step 20: considering the field of view ahead of the vehicle, elect bold stroke 6 as a specific location of the extended low-beam area 10 where light intensity cannot be less than 500 cd, which is a threshold higher than the limited illumination power of the extended low-beam area, and monitored region 5*b* as a specific region of the extended area 10 where light intensity cannot exceed the anti-glare limit of 1080 cd,
- step 21: calculate the amount of illumination in the specific region of the field of vision with the high module and the low module on,
- step 22: simulate the illumination of the vision field in said calculated operating conditions of the high module, combined with the low module switched on,
- step 23: if, in specific region 5*b*, high module 13 is on and the amount of illumination is higher than the glare limit, then:
- step 24: switch off at least partially intermediary module 15 so that intermediary elongated area 11 does not cover specific region 5*b*,
- step 25: if, in specific region 5*b*, high module 13 is off and the amount of illumination in specific location 6 is lower than the threshold, then:
- step 26: switch on intermediary module 15 as in FIG. 4 and FIG. 7, so intermediary elongated area 11 increases light of low beam extended area 10.

The invention is not limited to disclosed embodiments. In particular:

Each light source within its respective module is an LED or other high-efficiency technology; however, halogen bulbs and xenon lamps may also be used as alternatives. To achieve adjustable power output from the low module, various techniques are employed: adjusting current or voltage control for different illumination levels, using diffusers to distribute energy between regions, or beam splitters redirecting light among areas.

Multiple high-beam lights within a single module may combine their beams through lightguides, prisms and lenses. The optics in each module may comprise combinations of cylindrical, spherical lens shapes influencing directionality and spread; aperture sizes regulating overall illumination levels by controlling the amount of entering/exiting energy; beam splitters redirecting light between regions to achieve desired patterns.

The use of optical filters or beam splitters may enable multiple light sources within each module to contribute their respective beams in specific regions. This would allow for more precise control over illumination patterns and power output levels across different areas of projection. For example, high-beam LEDs may be used primarily for long-range visibility while low-beam LEDs provide supplementary lighting at lower intensities.

A single LED may be used within each module's optics configuration and its output power adjusted through the use of adjustable current control devices (e.g., pulse-width modulation) for both areas simultaneously. By modulating light intensity in this manner, precise adjustments may be made to overall brightness without requiring multiple LEDs or complex optical configurations.

Multiple intermediate beams may be projected simultaneously by the intermediary module through a process known as "beam splitting" or "light sharing." This technique involves directing light waves along different paths using optical elements such as prisms or lenses before recombining them at specific points within its designated area. By controlling these beam-splitting processes, it is possible to create complex illumination patterns that adapt dynamically based on driving conditions.

LIST OF REFERENCES

1 road
2 lateral lanes
3 center line divider
4 curve showing an opposite driver eye position at 0.9 m (2.95 ft) height
5 curve showing an opposite driver eye position at 0.7 m (2.30 ft) height
4*a*, 4*b*, 4*c*, 4*d* specific regions where illumination cannot exceed a certain limit in curve 4
5*a*, 5*b*, 5*c*, 5*d* specific regions where illumination cannot exceed a certain limit in curve 5
6 specific location of minimal illumination at 0.5° up
7 specific location of minimal illumination at 1.5° up
8 high module area
9 low module primary area
10 low module extended area
11 intermediary module area
12 headlamp
13 high module
14 low module
15 intermediary module
16 ADB system
17 camera
18 simulation module
19 detected car position
20-26 steps
27 computer
28 low-beam projector lens
29 input surface
30 output surface
31 lip

The invention claimed is:

1. A vehicle headlamp comprising at least three modules producing a beam intended to be projected ahead of the vehicle when the headlamp is mounted thereon to illuminate a field of view defined in relation to the position of a driver seated in the vehicle, wherein each module comprises a light source and a set of optics configured so that said module projects its beam over an elongated area of the field of view, said elongated area having a rectangular or ovoid shape extending along a horizontal axis, and wherein the at least three modules comprise a high module projecting a high beam over a high elongated area, a low module projecting a low beam over a primary low elongated area and an intermediary module projecting an intermediary beam over an intermediary elongated area;

and wherein the primary low elongated area is located below the high elongated area, and wherein the intermediary elongated area overlaps both the primary low elongated area and the high elongated area, characterized in that the low module is configured so that it also projects light at a lower illumination power compared to the illumination power of the primary low elongated area over an extended area connected to and located above the primary low elongated area and partially overlapping the intermediary elongated area.

2. The vehicle headlamp of claim 1, further comprising a light source in the low module that produces multiple levels of illumination over the primary low elongated area and the low module extended area above the primary low elongated area.

3. The vehicle headlamp of claim 1, wherein each elongated area has dimensions varying depending on driving scenarios, comprising high-beam areas ranging from 8°×30° to 12°×50°, low-beam areas larger than the high beam areas, and intermediary beam areas comprising a moderate size.

4. The vehicle headlamp of claim 1, wherein the optics configuration in each module affects its beam pattern through lens shapes, aperture sizes, and beam splitters.

5. The vehicle headlamp of claim 1, further comprising a control unit that adjusts power output based on ambient lighting conditions to maintain consistent illumination levels across different regions.

6. The vehicle headlamp of claim 1, wherein the size and shape of the primary low elongated area is adjustable for city vs highway modes or other driving scenarios.

7. The vehicle headlamp of claim 1, wherein the light source used within the modules is an LED-based technology for energy efficiency and reliability.

8. The vehicle headlamp of claim 1, wherein the light source of the high and/or intermediary module is divided into many segments.

9. The vehicle headlamp of claim 1, wherein the intermediary beam is a kink beam.

10. A method for controlling the vehicle headlamp of claim 1, characterized in that it includes the following steps:

considering the field of view ahead of the vehicle, electing a specific location of the extended area where light intensity cannot be less than a threshold higher than the limited illumination power, and a specific region of the extended area, not including the specific location but relatively close to it, where light intensity cannot exceed a glare limit, calculating the amount of illumination in the specific region of the field of view with the high module and the low module on, if, in the specific region, the high module is on and the amount of illumination is higher than the glare limit, switch off at least partially the intermediary module so that the intermediary-elongated area does not cover the specific region;

if, in the specific region, the high module is off and the amount of illumination in the specific location is lower than the threshold, switch on the intermediary module so that the intermediary elongated area increases light of the extended area.

11. A computer system for controlling a vehicle headlamp, characterized in that said system comprises a computer loaded with instructions that, when executed by said computer, cause the computer to perform the method of claim 10.

12. A vehicle headlamp system comprising the headlamp of claim 1, an ADB system able to monitor the vehicle's actual environment in the field of view and calculate operating conditions of the high module adapted to said actual environment, and a simulation module able to simulate the illumination of the field of view in the calculated operating conditions of the high module, with the low module switched on.

13. The vehicle headlamp of claim 1, further comprising an adjustable power output range for each module to meet different driving scenarios, comprising high beams with a maximum intensity up to approximately 1,000 cd, low beams with a minimum illumination level down to around 500 cd, and adjustability between these ranges.

* * * * *